(No Model.)

W. F. RICE.
HORSESHOE.

No. 428,229. Patented May 20, 1890.

WITNESSES:
Charles L. Bakom
Danford M. Crosby

INVENTOR
William F. Rice;
BY
Moulton & Rogers,
ATTORNEYS

UNITED STATES PATENT OFFICE.

WILLIAM F. RICE, OF ALPINE, MICHIGAN.

HORSESHOE.

SPECIFICATION forming part of Letters Patent No. 428,229, dated May 20, 1890.

Application filed February 5, 1890. Serial No. 339,374. (No model.)

*To all whom it may concern:*

Be it known that I, WILLIAM F. RICE, a citizen of the United States, residing at Alpine, in the county of Kent and State of Michigan, have invented certain new and useful Improvements in Horseshoes; and I do hereby declare the following to be a full, clear, and exact description of the invention, such as will enable others skilled in the art to which it appertains to make and use the same.

My invention relates to horseshoes; and my object is to provide an elastic cushion for the heel-calk of such shoes for lessening the shock to the horse from the impact of the hoof upon hard surfaces, thereby saving the hoof from injuries resulting therefrom and rendering the animal more comfortable; and it consists in the construction, combination, and arrangement of the parts hereinafter described, and more particularly pointed out in the claim, reference being had to the accompanying drawings, in which—

Figure 1:
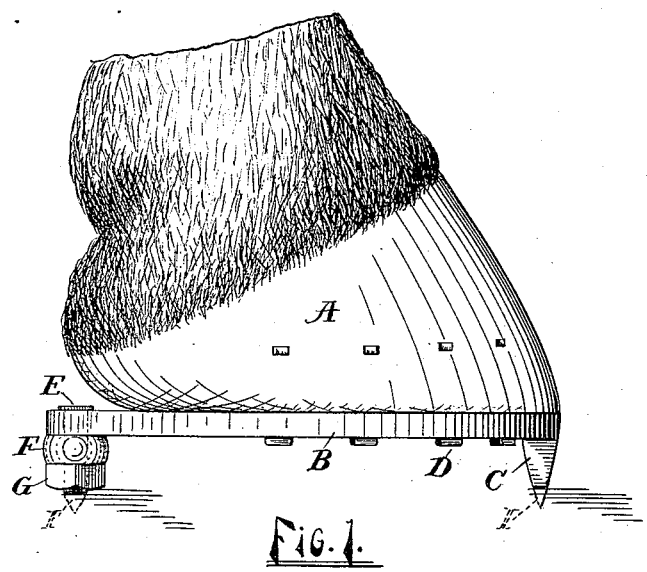
Figure 2:
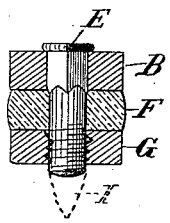

Figure 1 is a side elevation of a device embodying my invention, and Fig. 2 a vertical section of the heel-calk.

A represents the hoof of a horse, to which is attached a shoe B by usual nails D, and having a toe-calk C. Instead of the usual heel-calk, at the heel of the shoe is placed an opening, in which is secured a bolt E, (which may be provided with a sharp point I to prevent slipping,) and provided with a nut G. Between the nut G and the under surface of the shoe I place a cushion or spring F, of elastic dense material, (preferably rubber,) which gives or springs somewhat when the weight of the horse is thrown upon the hoof.

I am aware that it is not broadly new to insert an elastic cushion underneath a horseshoe or between the shoe and the calk, and I do not claim, broadly.

What I claim, and desire to secure by Letters Patent, is—

The combination, with the shoe B, having the toe-calk C, and provided with an aperture at the heel for containing a bolt, of a bolt E, capable of free vertical movement in the aperture, and having a threaded end and a nut G on the said end, and a cushion F of elastic material between the shoe and the nut, substantially as described, and for the purposes set forth.

In testimony whereof I affix my signature in presence of two witnesses.

WILLIAM F. RICE.

Witnesses:
 DENNIS L. ROGERS,
 LUTHER V. MOULTON.